(12) United States Patent
Rivera et al.

(10) Patent No.: US 9,639,693 B2
(45) Date of Patent: May 2, 2017

(54) TECHNIQUES FOR DETECTING A SECURITY VULNERABILITY

(71) Applicant: Symantec Corporation, Mountain View, CA (US)

(72) Inventors: Shireen Rivera, Los Angeles, CA (US); Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 97 days.

(21) Appl. No.: 13/931,426

(22) Filed: Jun. 28, 2013

(65) Prior Publication Data

US 2015/0007315 A1    Jan. 1, 2015

(51) Int. Cl.
*G06F 21/51* (2013.01)
*G06F 21/56* (2013.01)
*G06F 21/57* (2013.01)

(52) U.S. Cl.
CPC ............ *G06F 21/51* (2013.01); *G06F 21/566* (2013.01); *G06F 21/577* (2013.01)

(58) Field of Classification Search
CPC .......... G06F 21/51; G06F 21/56; G06F 21/57; G06F 21/577; G06F 21/52; G06F 21/50; G06F 11/3604; G06F 21/121; G06F 21/316; G06F 8/60; G06F 11/3051; H04L 67/10; H04L 63/145; H04L 63/20; H04L 63/1433; H04L 43/08; H04W 12/08
USPC ............................. 726/23, 22, 25, 1; 709/224
See application file for complete search history.

(56) References Cited

U.S. PATENT DOCUMENTS

| | | | |
|---|---|---|---|
| 8,001,606 B1* | 8/2011 | Spertus ........................... | 726/25 |
| 8,286,219 B2* | 10/2012 | Khalid et al. ..................... | 726/1 |
| 2006/0090192 A1* | 4/2006 | Corby et al. ...................... | 726/1 |
| 2010/0077445 A1* | 3/2010 | Schneider et al. ................ | 726/1 |

(Continued)

FOREIGN PATENT DOCUMENTS

| | | |
|---|---|---|
| EP | 2169580 A2 | 3/2010 |
| WO | WO-2013/049299 A1 | 4/2013 |
| WO | WO-2013/059131 A1 | 4/2013 |

OTHER PUBLICATIONS

Loffe (2009).To catch a cyberthief: How Symantec does it, retrieved Mar. 30, 2010 from Http://brainstormtech.blogs.fortune.cnn.com.*

(Continued)

*Primary Examiner* — Brian Shaw
(74) *Attorney, Agent, or Firm* — Wilmer Cutler Pickering Hale and Dorr LLP

(57) ABSTRACT

Techniques for detecting security vulnerabilities are disclosed. In one particular embodiment, the techniques may be realized as a method for detecting security vulnerabilities including assigning a reputation to an application, distributing the reputation to a client, receiving monitored system behavior from the client related to the client executing the application, determining whether to change the reputation of the application based on the monitored system behavior, distributing the changed reputation to the client, receiving further monitored system behavior from the client, and determining whether to generate a rule for the application based on the monitored system behavior received from the client.

20 Claims, 5 Drawing Sheets

(56) References Cited

U.S. PATENT DOCUMENTS

| | | | |
|---|---|---|---|
| 2011/0145920 A1* | 6/2011 | Mahaffey | G06F 21/564 726/22 |
| 2011/0185428 A1 | 7/2011 | Sallam | |
| 2012/0117650 A1* | 5/2012 | Nachenberg | G06F 21/562 726/24 |
| 2013/0081103 A1* | 3/2013 | Uner et al. | 726/1 |
| 2013/0097659 A1* | 4/2013 | Das | G06F 21/629 726/1 |
| 2013/0254880 A1* | 9/2013 | Alperovitch et al. | 726/22 |

OTHER PUBLICATIONS

Extended European Search Report issued in corresponding European Patent Application No. 14818268.6, dated Dec. 21, 2016, 9 pages.

* cited by examiner

TECHNIQUES FOR DETECTING A SECURITY VULNERABILITY

FIELD OF THE DISCLOSURE

The present disclosure relates generally to computer viruses and malware and, more particularly, to techniques for detecting a security vulnerability.

BACKGROUND OF THE DISCLOSURE

Computer viruses and malware often exploit previously unknown security vulnerabilities, also known as zero day exploits. These computer viruses and malware may cause many problems including: access to sensitive or private data, reduction of system performance, and diversion of system resources. Accordingly, detection of such security vulnerabilities has become very important. However, traditional methods of detecting security vulnerabilities require retroactive analysis of system behavior to identify a security vulnerability exploited by a computer virus or malware.

In view of the foregoing, it may be understood that there may be significant problems and shortcomings associated with traditional security vulnerability detection.

SUMMARY OF THE DISCLOSURE

Techniques for detecting a security vulnerability are disclosed. In one particular embodiment, the techniques may be realized as a method for detecting a security vulnerability comprising assigning a reputation to an application; distributing the reputation to a client; receiving monitored system behavior from the client related to the client executing the application; determining whether to change the reputation of the application based on the monitored system behavior; distributing the changed reputation to the client; receiving further monitored system behavior from the client; and determining whether to generate a rule for the application based on the monitored system behavior received from the client.

In accordance with other aspects of this particular embodiment, the reputation indicates whether the application is one of trusted, neutral, suspicious, and malicious.

In accordance with other aspects of this particular embodiment, the application is a new application from a known entity.

In accordance with other aspects of this particular embodiment, the reputation of the application is assigned based on the known entity.

In accordance with other aspects of this particular embodiment, the application is executed on the client based on the received reputation.

In accordance with other aspects of this particular embodiment, the reputation of the application is changed when the monitored system behavior indicates that the application is exhibiting suspicious behavior.

In accordance with other aspects of this particular embodiment, the reputation of the application is changed based on monitored system behavior received from a plurality of clients executing the application.

In accordance with other aspects of this particular embodiment, the monitored system behavior includes detailed information regarding the behavior of the client system and the application being executed on the client.

In accordance with other aspects of this particular embodiment, the rule for the application indicates that the application is to be one of quarantined, prevented from accessing certain client resources, executed on a virtual client, and permitted full access to client resources.

In accordance with further aspects of this particular embodiment, the method comprises transmitting the generated rule for the application to the client.

In another particular embodiment, the techniques may be realized as least one non-transitory processor readable storage medium storing a computer program of instructions configured to be readable by at least one processor for instructing the at least one processor to execute a computer process for performing the method comprising assigning a reputation to an application; distributing the reputation to a client; receiving monitored system behavior from the client related to the client executing the application; determining whether to change the reputation of the application based on the monitored system behavior; distributing the changed reputation to the client; receiving further monitored system behavior from the client; and determining whether to generate a rule for the application based on the monitored system behavior received from the client.

In another particular embodiment, the techniques may be realized as a method for detecting a security vulnerability comprising assigning a reputation to an application; executing the application based on the assigned reputation; monitoring system behavior while executing the application; reporting the monitored system behavior to a backend system; determining whether a changed reputation for the application has been received from the backend system; monitoring the system behavior based on the changed reputation; transmitting the monitored system behavior to the backend system; and determining whether a new rule for the application has been received from the backend system.

In accordance with other aspects of this particular embodiment, the reputation is assigned to the application based on behavior of the application during installation of the application.

In accordance with additional aspects of this particular embodiment, monitoring the system behavior comprises at least one of monitoring for unauthorized system resource access, unauthorized writing to a system operating system, termination of a security application, and unauthorized network activity.

In accordance with additional aspects of this particular embodiment, the system behavior is monitored for known suspicious and malicious behavior based on heuristics.

In accordance with additional aspects of this particular embodiment, the system behavior is monitored at a first frequency when the assigned reputation indicates that the application is trusted and the system behavior is monitored at a second frequency higher than the first frequency when the changed reputation indicates that the application is less than trusted.

In accordance with additional aspects of this particular embodiment, when suspicious system behavior is detected, execution of the application is continued in accordance with the assigned reputation being trusted.

In accordance with further aspects of this particular embodiment, the method comprises executing the application based on the received rule.

In another particular embodiment, the techniques may be realized as least one non-transitory processor readable storage medium storing a computer program of instructions configured to be readable by at least one processor for instructing the at least one processor to execute a computer process for performing the method comprising assigning a reputation to an application; executing the application based on the assigned reputation; monitoring system behavior while executing the application; reporting the monitored system behavior to a backend system; determining whether a changed reputation for the application has been received from the backend system; monitoring the system behavior based on the changed reputation; transmitting the monitored system behavior to the backend system; and determining whether a new rule for the application has been received from the backend system.

In another particular embodiment, the techniques may be realized as a system for detecting a security vulnerability comprising one or more processors communicatively coupled to a network; wherein the one or more processors are configured to: assign a reputation to an application; distribute the reputation to a client; receive monitored system behavior from the client related to the client executing the application; determine whether to change the reputation of the application based on the monitored system behavior; distribute the changed reputation to the client; receive further monitored system behavior from the client; and determine whether to generate a rule for the application based on the monitored system behavior received from the client.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
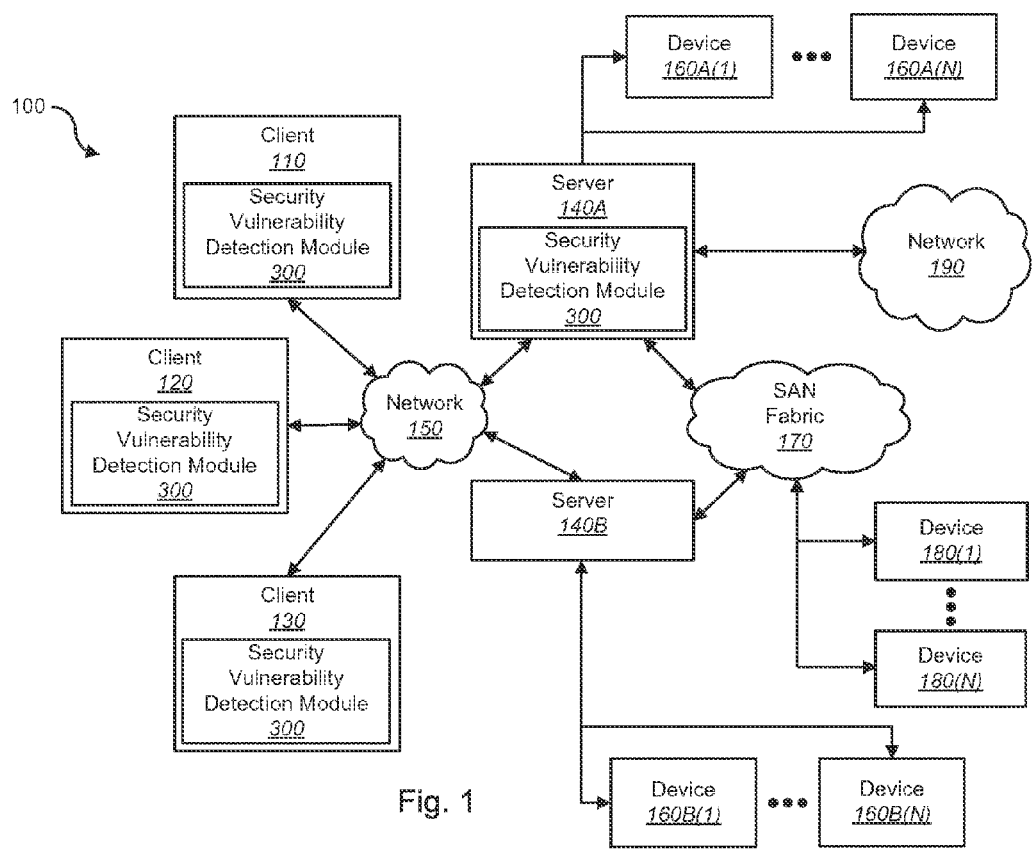
FIG. 1 shows a block diagram depicting a network architecture in accordance with an embodiment of the present disclosure.

FIG. 1 shows a block diagram depicting a network architecture for detecting security vulnerabilities in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain a security vulnerability detection module (e.g., security vulnerability detection module 300). In addition, servers 140A and 140B may contain a security vulnerability detection module (e.g., security vulnerability detection module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
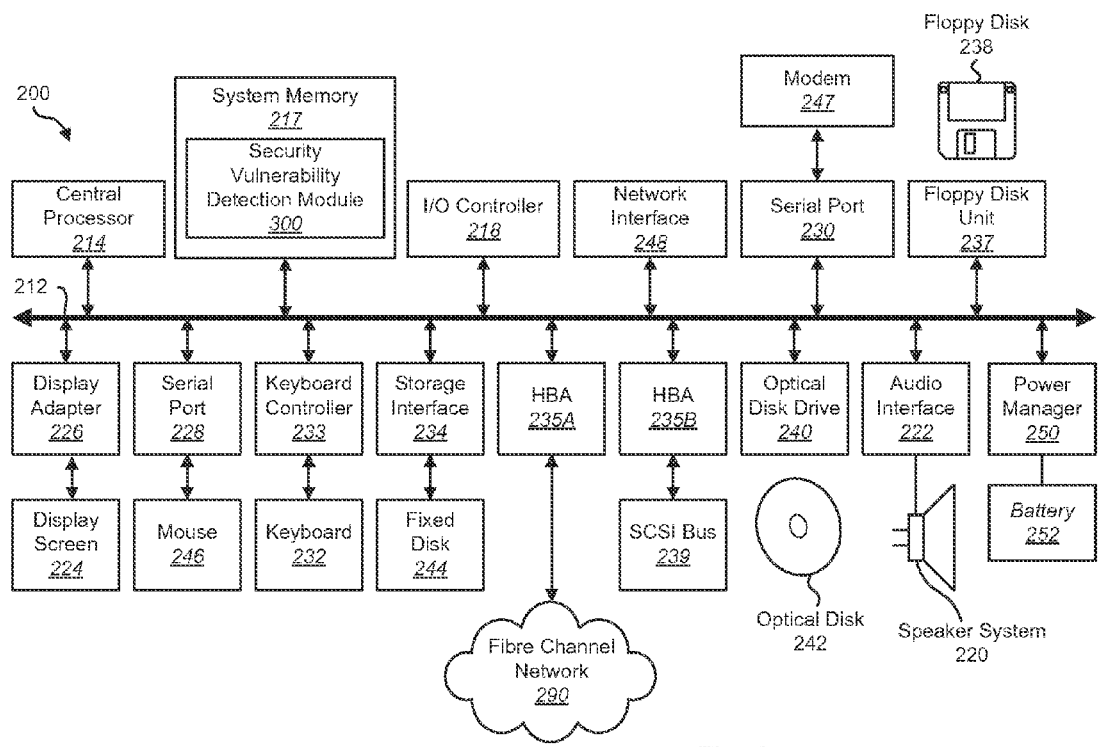
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may have a security agent implemented thereon to protect the client systems from computer viruses and/or malware, and be in communication with a backend security system implemented on server 140A.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. For example, storage devices 160B(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy. According to other embodiments, servers 140A and 140B may identify security vulnerabilities based on collected information from any source including clients 110 120, and 130. As a result, servers 140A and 140B may distribute information to clients 110, 120, and 130 to prevent malware and viruses from exploiting security vulnerabilities at the clients 110, 120, and 130.

According to some embodiments, clients 110, 120, and 130 may contain one or more portions of software for detection of security vulnerabilities such as, for example, security vulnerability detection module 300. In addition, server 140A may contain one or more portions of software for detection of security vulnerabilities such as, for example, security vulnerability detection module 300. As illustrated, one or more portions of the security vulnerability detection module 300 may reside at a network centric location. According to some embodiments, network 190 may be an external network (e.g., the Internet) and server 140A may be a gateway or firewall between one or more internal components and clients and the external network. According to some embodiments, the security vulnerability detection module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the security vulnerability detection module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
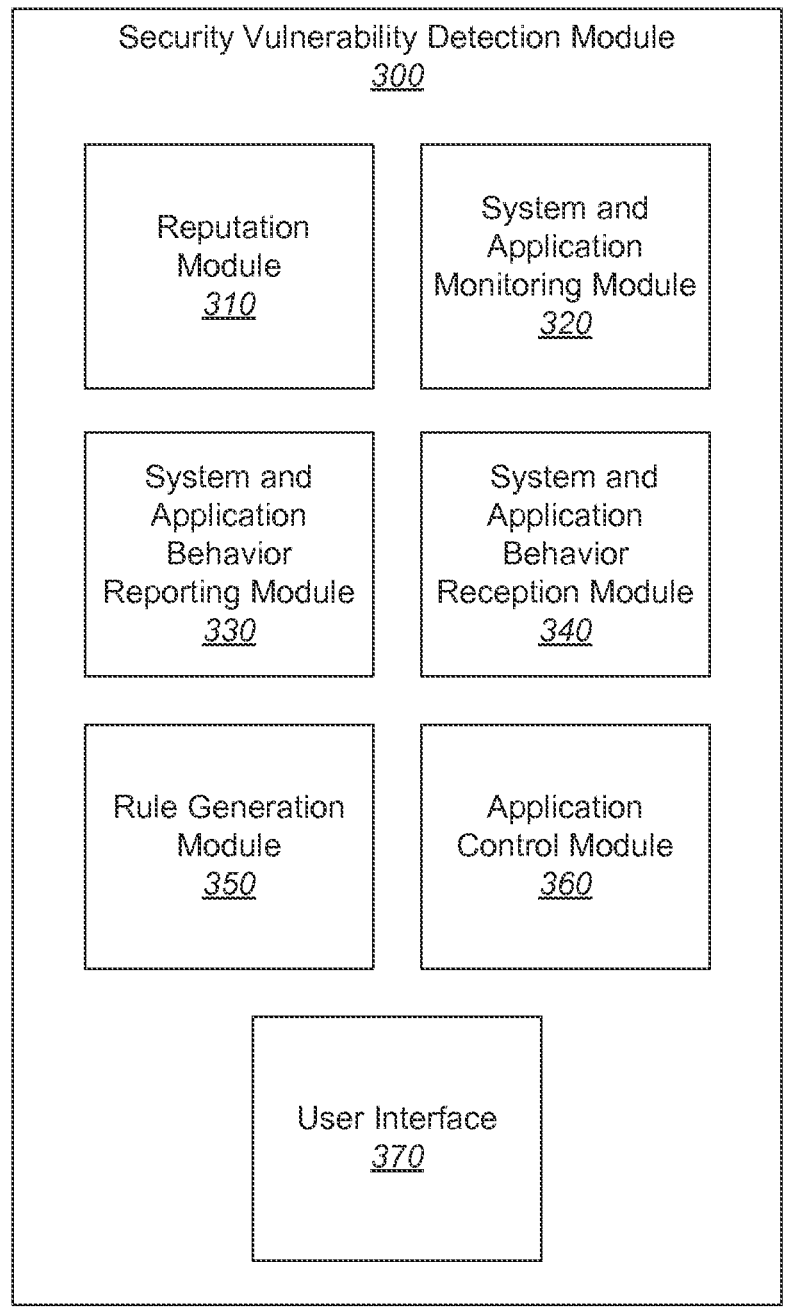
FIG. 3 shows a security vulnerability detection module in accordance with an embodiment of the present disclosure.

FIG. 3 shows a security vulnerability detection module 300 in accordance with an embodiment of the present disclosure. As illustrated, the security vulnerability detection module 300 may contain one or more components including a reputation module 310, a system and application monitoring module 320, a system and application behavior reporting module 330, a system and application behavior reception module 340, a rule generation module 350, an application control module 360, and a user interface 370.

The reputation module 310 may manage a reputation for one or a plurality of applications and processes to be executed on one or a plurality of clients (e.g., clients 110, 120, and 130). In some embodiments, the reputation module 310 may assign a reputation to each application or process being executed on each client within the network based on a plurality of factors. For example, the reputation module 310 may assign a reputation to an application based on the developer of the application, a reputation of a previous version of the application, characteristics or behavior of the application upon installation or at a later time, a whitelist, or any other factor. In addition, the reputation module 310 may modify the reputation of an application if the application begins to exhibit suspicious or malicious behavior. This behavior may be determined using heuristics and based on system and application behavior reported from at least one client.

The system and application monitoring module 320 may monitor the behavior of a system and each of the applications or processes being executed on a client. In some embodiments, the system and application monitoring module 320 may be implemented as part of a security agent at a client. The system and application monitoring module 320 may monitor various types of behavior of the client. For example, system and application monitoring module 320 may monitor a client for unauthorized system directory access or modifications, unauthorized writing to an operating system, termination of security applications such as anti-virus applications, and malicious network activity. In some instances, the system and application monitoring module 320 may utilize heuristics to monitor the behavior of the client to identify specific risky or suspicious behavior to be reported.

The system and application behavior reporting module 330 may report the results of the system and application behavior monitored by the system and application monitoring module 320. In some embodiments, the system and application behavior reporting module 330 may report the behavior to a backend system (e.g., server 140A) from a client (e.g., client 110, 120, or 130). The system and application behavior reporting module 330 may report the results of the monitored system and application behavior at regular intervals which may be varied depending on the activity at the client, continuously, or upon the occurrence of a particular behavior or activity at a client.

The system and application behavior reception module 340 may receive the results of the system and application behavior transmitted by the system and application behavior reporting module 330. In some embodiments, the system and application behavior reception module 340 may be arranged at a backend system (e.g., server 140A) and be configured to receive system and application behavior information from one or a plurality of clients (e.g., clients 110, 120, and 130).

The rule generation module 350 may generate a rule for a particular application based on the system and application behavior received by the system and application behavior reception module 340. In some instances, the rule generation module 350 may generate a rule to restrict the application when it is determined that the application is exhibiting suspicious behavior. For example, the rule may indicate that the application is to be completely blocked due to a known virus or malware infection, executed only on a virtual client due to suspicion of a virus or malware infection, or granted access to all system resources due to a known absence of any viruses or malware.

The application control module 360 may control the application in accordance with the rule generated by the rule generation module 350. The application control module 360 may determine permissions for the application based on a reputation from the reputation module 310, a rule from the rule generation module 350, and behavior of the system and application detected by the system and application monitoring module 320. In some embodiments, the application control module 360 may restrict the access of the application to certain system resources based on the generated rule. In other embodiments, the application control module 360 may permit the application full access to system resources when the application has a trusted reputation. In another embodiment, the application control module 360 may permit the application limited access to certain system resources based on a trusted reputation even though the application is exhibiting suspicious behavior.

The user interface 370 may provide a user or administrator with an interface to control any aspect to the processes described below. For example, the user interface 370 may display information about the system and application behavior monitored by the system and application monitoring module 320.

Figure 4:
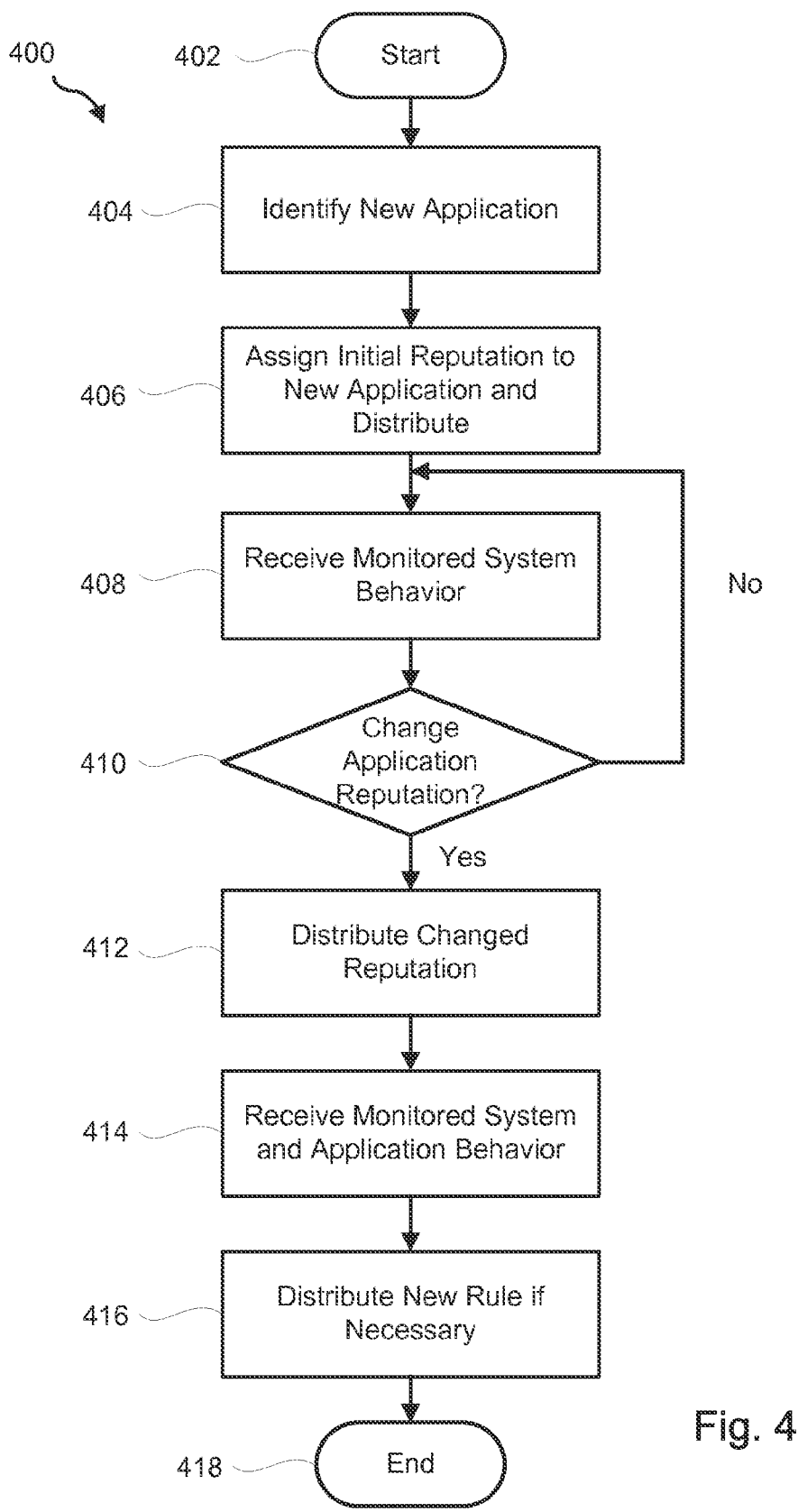
FIG. 4 a method for detecting security vulnerabilities in accordance with an embodiment of the present disclosure.

FIG. 4 shows a method 400 for detecting security vulnerabilities in accordance with an embodiment of the present disclosure. The method 400 may be performed across multiple devices including for example clients 110, 120, 130, and server 140A independently. However, any portion of the method 400 described below may be performed on any one of clients 110, 120, 130, and server 140A. At block 402, the method 400 may begin.

At block 404, a new application may be identified. In some embodiments, the new application may be identified by the reputation module 310. The newly identified application may be a new software program or application recently released by a developer. Additionally, the newly identified application may be an updated version of a previously known application. In some embodiments, the new application may be reported by the developer to a backend system which may maintain a list of known applications. Additionally, clients (e.g., clients 110, 120, and 130) which have the new applications installed thereon may report the existence of a new application to a backend system (e.g., server 140A). The identification of the new application may also be performed at a backend system based on information received from a plurality of clients having the same application installed thereon. After the new application has been identified, the overall process may then proceed to block 406.

At block 406, an initial reputation may be assigned to the newly identified application. In some embodiments, the initial reputation may be assigned by the reputation module 310. The reputation may indicate a level of trust for the new application. For example, the new application may be assigned a good reputation (e.g., "safe") having a high level of trust based on the developer that released the new application. Additionally, the new application may be assigned a good reputation (e.g., "safe") based on the installation of the application across multiple clients with no associated malware infections detected at the time of installation. In some embodiments, the initial reputation may be assigned to the new application by a client based on the behavior of the new application when it was installed. In other embodiments, a backend system may assign the initial reputation to the new application based on information about the software and/or information reported from at least one client having the application installed thereon. However, the reputation may be assigned to the new application based on any number of factors. Additionally, when the initial reputation assigned to the new application is a good reputation the information may be stored in a white list of trusted applications. After the initial reputation has been assigned to the newly identified application, the overall process may then proceed to block 408.

At block 408, monitored system behavior may be received from at least one client. In some embodiments, the monitored system behavior may be received by the system and application behavior reception module 340. In some instances, the monitored system behavior may be received from a plurality of clients (e.g., clients 110, 120, and 130) at a backend system (e.g., server 140A). The monitored system behavior may indicate whether a client is exhibiting suspicious behavior and include details regarding the suspicious behavior. Alternatively, the monitored system behavior may indicate that no suspicious behavior is occurring at the client. The received system behavior may specify which applications are being executed or are running on the client and any behavior associated with the particular applications. Further, the received system behavior information may indicate whether a new potentially malicious behavior is being observed even though no new applications have been installed on the client. The monitored system behavior may include behavior information of the overall client, previously existing applications or processes, the new application, and any combination of information useful in determining whether an application or process is exhibiting suspicious behavior and should be quarantined. The monitored system behavior may be received at regular intervals, continuously, or at any other time. After the monitored system behavior has been received, the process may then proceed to block 410.

At block 410, whether or not to change the initial reputation of the new application may be determined. In some embodiments, whether or not to change the initial reputation of the new application may be determined by the reputation module 310. The initial reputation of the new application may be changed from a good or safe reputation to a reputation of lower trust based on the monitored system behavior received from one or many clients. For example, the initial reputation may be changed from good to suspicious when one client reports that the application is exhibiting suspicious behavior. In some embodiments, a determination of whether to change the reputation of an application may be based on heuristics.

Additionally, the initial reputation may be changed from good to suspicious when a plurality of clients report that the specific application is exhibiting suspicious behavior. In some embodiments, the reputation may be changed when a preset number or threshold number of clients report that the application is exhibiting suspicious behavior. Further, the reputation of the new application may be changed from good or safe to bad when it is determined that the application is exhibiting particular malware or virus characteristics from one or more clients. However, the good or safe reputation may be maintained if no suspicious characteristics or behavior are reported from the clients. A reputation of an application may also be improved from bad to suspicious or from suspicious to safe based on the received monitored system behavior from at least one client. For example, it may be determined that a first application suspected of being responsible for suspicious behavior was not the actual application exhibiting the suspicious behavior. Accordingly, the reputation of the application can be changed from suspicious to neutral or good.

At block 410, a determination may also be made to change the reputation of any other known application or process based on the system behavior reported from at least one client. If it is determined that the reputation of the new application or any other application does not need to be changed, then the process may proceed back to block 408 where additional system behavior may again be received. If it is determined that that the reputation of the new application or any other application does need to be changed, then the process may proceed back to block 412.

At block 412, the changed reputation for the identified application may be distributed to each client in the network. In some embodiments, the changed reputation for the identified application may be distributed by the reputation module 310. In some instances, the changed reputation may be distributed from the backend system (e.g., server 140A) to each of the clients in the network (e.g., clients 110, 120, and 130). After the changed reputation has been distributed, the process may proceed to block 414.

At block 414, monitored system and application behavior may be received from at least one client. In some embodiments, the monitored system and application behavior may be received by the system and application behavior reception module 340. In some instances, the monitored system and application behavior may include information about one application or process, a plurality of applications or processes, and system behavior. Additionally, the monitored system and application behavior may include detailed information on applications or processed having a suspicious or untrusted reputation. The monitored system and application behavior may be received from one client or a plurality of clients performing various trusted and/or suspicious applications. In some embodiments, the monitored system and application behavior may include more detail on the behavior of a particular application based on a change in the reputation of that application distributed to the clients at block 412. The monitored system and application behavior may be received from the plurality of clients simultaneously or sequentially at periodic intervals, continuously, or at any other time. After the monitored system and application behavior has been received, the process may proceed to block 416.

At block 416, it may be determined whether to generate and distribute a new rule to at least one client based on the received system and application behavior. In some embodiments, the rule generation module 350 may determine whether a new rule should be generated and distributed to the clients. In some instances, a new rule may be generated when the received monitored system and application behavior indicates that a particular application or process exhibits suspicious and/or malicious behavior. The determination of whether to generate a new rule may be based on an analysis of monitored system and application behavior received from a single client or a plurality of clients. In some embodiments, a new rule for a particular application may be generated when the monitored application behavior indicates that the particular application is responsible for suspicious and/or malicious behavior from one client.

Additionally, a new rule for a particular application may be generated when the monitored application behavior indicates a specific behavior that is suspicious across multiple clients and the particular application is being executed or performed across each of the clients. As a result, an inference may be drawn that the particular application is responsible for the suspicious or malicious behavior and a new rule may be generated for that particular application. The new rule may instruct the clients to perform any one of a plurality of known security measures. For example, the new rule may indicate that the application is to be prevented from being loaded or executed, the application is to be executed in a secure sandbox, or the application is to be moved to a virtual client for execution.

The new rule may be distributed to each client within the network. In some instances, the new rule may be distributed to the clients executing the particular application associated with the new rule without transmitting the new rule to clients not executing the particular application. The new rule may be distributed to the clients immediately after the new rule is generated or may be distributed as part of a periodic update distributed to the clients. After the new rule has been distributed, the overall process may then proceed to block 418. The overall process 400 may then repeat periodically or continuously. In some instances, various elements of the overall process may be performed concurrently or sequentially. For example, monitored system behavior may be received from a plurality of clients while a changed reputation for another application is being distributed to the clients.

Figure 5:
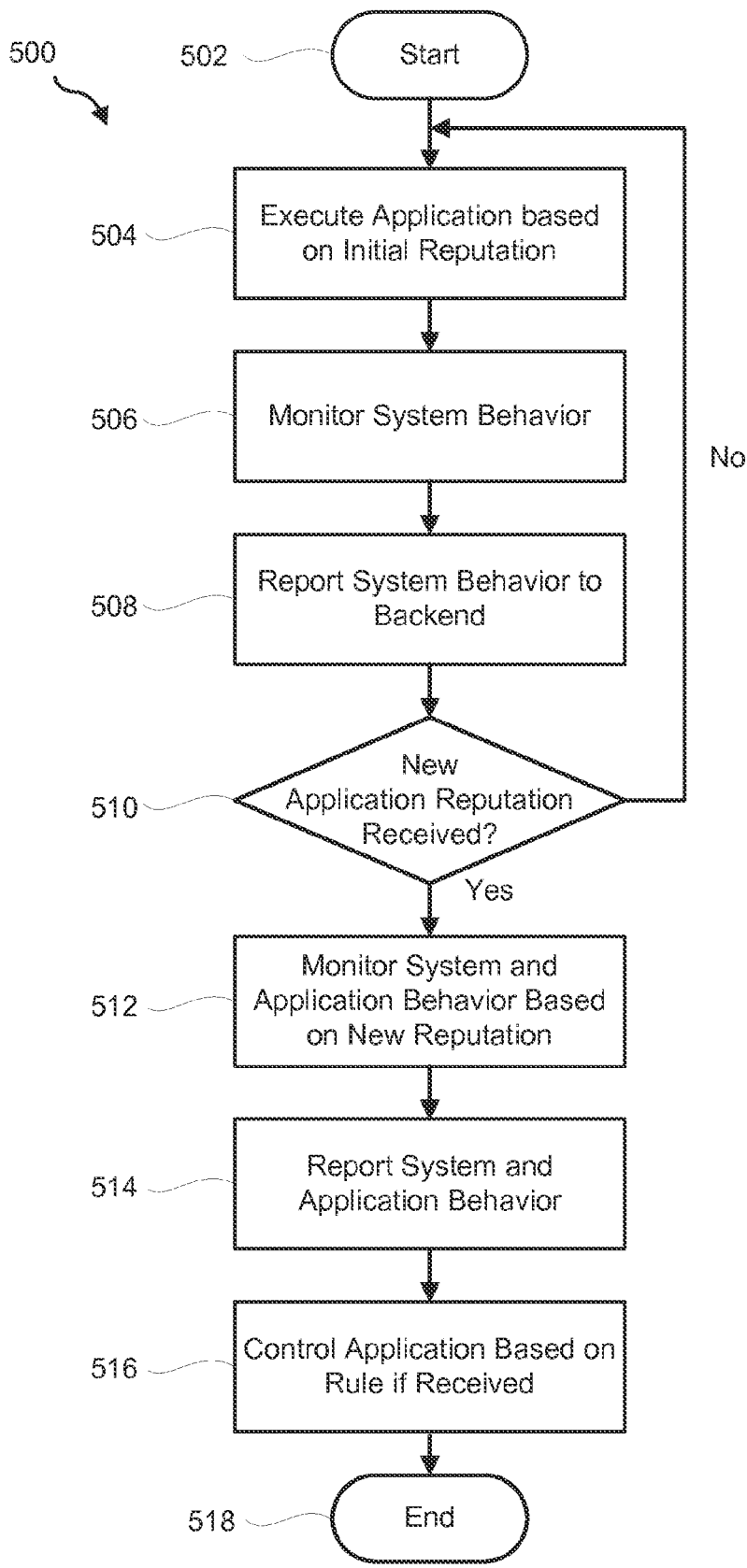
FIG. 5 a method for detecting security vulnerabilities in accordance with an embodiment of the present disclosure.

FIG. 5 shows a method 500 for detecting security vulnerabilities in accordance with an embodiment of the present disclosure. The method 500 may be performed across multiple devices including for example clients 110, 120, 130, and server 140A. However, any portion of the method 500 described below may be performed on any one of clients 110, 120, 130, and server 140A. At block 502, the method 500 may begin.

At block 504, an application may be executed or performed in accordance with an initial reputation. In some embodiments, the application may be executed at a client independently or concurrently with a plurality of additional applications or processes. The initial reputation may indicate whether the application is trusted and safe, potentially suspicious, suspicious, malicious, or any other classification. In some instances, the client executing the application may determine the initial reputation based on behavior of the application during and/or after installation of the application. In other instances, the client may receive an initial reputation from a backend system. Based on the reputation, the client may execute the application by permitting the application access to all available resources when the reputation is good or safe. Additionally, the client may execute the application by restricting access to resources when the reputation is less than good or safe. After the application has been executed based on the initial reputation, the overall process may proceed to block 506.

At block 506, behavior of the client system may be monitored. In some embodiments, the system and application monitoring module 320 may monitor the behavior of the client (e.g., client 110). The behavior of the client may be monitored in many ways. For example, the system may be monitored for unauthorized system directory access or modifications, unauthorized writing to an operating system, termination of security applications such as anti-virus applications, and malicious network activity. In some instances, heuristics may be utilized to monitor the behavior of the client to identify risky or suspicious behavior.

The monitoring of the system behavior may be performed concurrently with the execution of the application from block 504. Additionally, the monitoring may be performed for a predetermined time period at regular intervals or continuously. In some embodiments, the system behavior may be monitored in accordance with the reputations of the applications or processes being executed on the client. For example, when each application has a trusted or safe reputation, the system behavior may be monitored less frequently whereas if an application has a suspicious or untrusted reputation, the system may be monitored more frequently. The client may also monitor certain applications less frequently based on an associated trusted reputation whereas other applications may be monitored more frequently based on an associated suspicious reputation. The client may continue to execute an application even though suspicious behavior is being detected based on its reputation. In this instance, the reputation of the application may supersede the suspicious behavior until an updated reputation has been received. However, the client may terminate an application if a particular known malicious behavior is detected. After the system behavior has been monitored, the overall process may proceed to block 508.

At block 508, the monitored system behavior may be reported to a backend system (e.g., server 140A). In some embodiments, the system and application behavior reporting module 330 may report the monitored system behavior of the client (e.g., client 110) to the backend system (e.g., server 140A). After the monitored system and application behavior has been reported to the backend system, the process may proceed to block 510.

At block 510, it may be determined whether a new application reputation has been received. In some embodiments, the new application reputation may be received by the application control module 360. The new application reputation may be received from the backend system (e.g., server 140A) in response to suspicion behavior associated with an application being detected by the backend system. For instance, the backend system may automatically distribute a new reputation for a particular application to all clients within the network upon a determination that the particular application is exhibiting suspicious behavior as described above. If a new application reputation is not received, then the process may proceed back to block 504 such that the client may continue to execute applications, monitor the system behavior, and report the system behavior to the backend system. However, if a new application reputation is received, the process may proceed to block 512.

At block 512, the system and applications may be monitored based on the newly received application reputation. In some embodiments, system and applications may be monitored by the system and application monitoring module 320 in accordance with the newly received reputation. In some instances, the new reputation may indicate that the reputation of a particular application or process has decreased from a trusted level to a suspicious level or a suspicious level to a malicious level. If the new reputation indicates that the application is malicious then the application may be completely blocked or may be restricted to running in a secured sandbox or on a virtual client. Additionally, all of the system and application behavior may be monitored in greater detail when the application is identified as malicious.

If the new reputation indicates that a particular application is suspicious, then the behavior of that application and the overall system may be adjusted. For example, if the application was previously indicated as trusted, then the behavior may have been monitored on an infrequent basis. However, now that the reputation of the application has been lowered to suspicious, the behavior of the system and the particular application may be monitored with increased frequency. Alternatively, if the new reputation indicates that a particular application is no longer suspicious, the frequency that the system and application behavior is monitored may be decreased. The system and application behavior may be monitored for a predetermined period of time before the process proceeds to block 514. However, if a particular behavior of the system or an application is detected, the process may immediately proceed to block 514 to be reported. Accordingly, after the system and application behavior has been monitored, the process may proceed to block 514.

At block 514, the monitored system and application behavior in accordance with the new reputation may be reported to the backend system (e.g., server 140A). In some embodiments, the system and application behavior reporting module 330 may report the newly monitored system and application behavior of the client (e.g., client 110) to the backend system (e.g., server 140A). After the monitored system and application behavior has been reported to the backend system, the process may proceed to block 516.

At block 516, the application being executed may be controlled in accordance with a new rule if a new rule is received. In some embodiments, the application may be controlled by the application control module 360 in accordance with a rule received. In some instances, the backend system may distribute a new rule to clients based on the behavior of the clients reported to the backend system as described above. In particular, the backend system may issue a new rule that a specific application is to be prohibited from being executed, that the application is to be executed in a secured sandbox, that the application is executed on a virtual client, or that the access of the application to particular system resources is to be limited. Accordingly, if the backend system distributes a new rule for a particular application, then the client (e.g., client 110) may execute the application in accordance with that rule. However, if a new rule is not received from the backend, then the client may continue to execute the application and the overall process may proceed to block 518. At block 518, the overall process may be repeated continuously or periodically.

The overall process 500 may then repeat periodically or continuously. In some instances, various elements of the overall process may be performed concurrently or sequentially. For example, an application may be executed based on the initial reputation while also reporting system behavior to the backend system.

At this point it should be noted that detection of security vulnerabilities in accordance with the present disclosure as described above may involve the processing of input data and the generation of output data to some extent. This input data processing and output data generation may be implemented in hardware or software. For example, specific electronic components may be employed in the detection of security vulnerabilities or similar or related circuitry for implementing the functions associated with detecting security vulnerabilities in accordance with the present disclosure as described above. Alternatively, one or more processors operating in accordance with instructions may implement the functions associated with detecting security vulnerabilities in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for detecting a security vulnerability comprising:
   determining, at a backend system, an initial reputation of a new application, wherein the new application is a new version of a first application that was previously installed on a plurality of clients, and wherein the initial reputation is based on a reputation of the previous version of the first application, an analysis of a developer of the new version of the first application, and behavior of the new version of the first application during installation on a plurality of clients, wherein the behavior of the new version of the first application during installation on the plurality of clients is analyzed using heuristics;
   distributing the initial reputation from the backend system to the plurality of clients via a network;
   receiving, at the backend system, monitored system behavior from one of the plurality of clients related to the one of the plurality of clients executing the new application, wherein the monitored system behavior includes detailed information regarding the system behavior of the one of the plurality of clients, applications being executed on the one of the plurality of clients, the new application being executed on the one of the plurality of clients, and an indication of whether the new application is exhibiting malicious behavior, and wherein the one of the plurality of clients executes the new application based on a security enforcement for the new application determined in accordance with the initial reputation of the new application and a behavior of the new application subsequent to installation;
   determining, at the backend system, whether to change the initial reputation of the new application based on the monitored system behavior;
   distributing a changed initial reputation to the plurality of clients based on the determination;
   receiving further monitored system behavior based on the changed initial reputation from the one of the plurality of clients; and
   determining an action to be performed based on the further monitored system behavior received from the one of the plurality of clients, wherein the action to be performed comprises changing a reputation of a second application different from the first application and the new application.

2. The method of claim 1, wherein determining the reputation for the new application comprises assigning the reputation, and wherein the reputation indicates whether the new application is one of trusted, neutral, suspicious, and malicious.

3. The method of claim 1, wherein the analysis comprises determining whether the new application is from a known entity, and wherein the monitored system behavior is analyzed using heuristics.

4. The method of claim 3, wherein determining the reputation of the new application comprises assigning the new reputation, the reputation being assigned based on the known entity.

5. The method of claim 1, wherein the new application is executed on the plurality of clients based on the received reputation.

6. The method of claim 1, wherein the reputation of the new application is changed when the monitored system behavior indicates that the new application is exhibiting suspicious behavior.

7. The method of claim 5, wherein the reputation of the new application is changed based on monitored system behavior received from the plurality of clients executing the new application.

8. The method of claim 1, wherein the one of the plurality of clients terminates the new application when the behavior of the new application subsequent to installation is a known malicious activity.

9. The method of claim 1, wherein the action to be performed comprises generating a rule for the new application, and wherein the rule for the new application indicates that the new application is to be quarantined when the further monitored system behavior indicates that the new application is malicious, prevented from accessing certain client resources, executed on a virtual client when the further monitored system behavior indicates that the new application is suspicious, and permitted full access to client resources when the further monitored system behavior indicates that the new application is trusted.

10. The method of claim 9, further comprising:
transmitting the generated rule for the new application to the client.

11. At least one non-transitory processor readable storage medium storing a computer program of instructions configured to be readable by at least one processor for instructing the at least one processor to execute a computer process for performing the method as recited in claim 1.

12. A method for detecting a security vulnerability comprising:
receiving an initial reputation of a new application from a backend system, wherein the new application is a new version of a first application that was previously installed on a plurality of clients, and wherein the initial reputation is based on a reputation of the previous version of the first application, an analysis of a developer of the new version of the first application, and behavior of the new version of the first application during installation on a plurality of clients, wherein the behavior of the new version of the first application during installation on the plurality of clients is analyzed using heuristics;
determining a security enforcement for the new application based on the initial reputation of the new application and behavior of the new application subsequent to installation;
executing the new application based on the initial reputation and the determined security enforcement;
monitoring system behavior while executing the new application, wherein the monitored system behavior includes detailed information regarding the system behavior of the one of the plurality of clients, applications being executed on the one of the plurality of clients, the new application being executed on the one of the plurality of clients, and an indication of whether the new application is exhibiting malicious behavior;
reporting the monitored system behavior to the backend system, wherein the backend system determines an action to be performed based on the monitored system behavior, and wherein the action to be performed comprises changing a reputation of a second application different from the first application and the new application;
determining whether a changed reputation for the new application has been received from the backend system;
monitoring the system behavior based on the changed reputation; and
transmitting the monitored system behavior based on the changed reputation to the backend system.

13. The method of claim 12, wherein determining the reputation for the new application comprises assigning the reputation.

14. The method of claim 12, wherein monitoring the system behavior comprises at least one of monitoring for unauthorized system resource access, unauthorized writing to a system operating system, termination of a security application, and unauthorized network activity.

15. The method of claim 12, wherein the system behavior is monitored for known suspicious and malicious behavior based on heuristics.

16. The method of claim 12, wherein the system behavior is monitored at a first frequency when the assigned reputation indicates that the new application is trusted and the system behavior is monitored at a second frequency higher than the first frequency when the changed reputation indicates that the new application is less than trusted.

17. The method of claim 12, wherein, when suspicious system behavior is detected, execution of the new application is continued in accordance with the assigned reputation being trusted.

18. The method of claim 12, further comprising:
determining whether a new rule for the new application has been received from the backend system; and
executing the new application based on the received rule.

19. At least one non-transitory processor readable storage medium storing a computer program of instructions configured to be readable by at least one processor for instructing the at least one processor to execute a computer process for performing the method as recited in claim 12.

20. A system for detecting a security vulnerability comprising:
one or more processors communicatively coupled to a network; wherein the one or more processors are configured to:
determine, at a backend system, an initial reputation of a new application, wherein the new application is a new version of a first application that was previously installed on a plurality of clients, and wherein the initial reputation is based on a reputation of the previous version of the first application, an analysis of a developer of the new version of the first application, and behavior of the new version of the first application during installation on a plurality of clients, wherein the behavior of the new version of the first application during installation on the plurality of clients is analyzed using heuristics;
distribute the initial reputation from the backend system to the plurality of clients via a network;
receive, at the backend system, monitored system behavior from one of the plurality of clients related to the one of the plurality of clients executing the new application, wherein the monitored system behavior includes detailed information regarding the system behavior of the one of the plurality of clients, applications being executed on the one of the plurality of clients, the new application being executed on the one of the plurality of clients, and an indication of whether the new application is exhibiting malicious behavior, and wherein the one of the plurality of clients executes the new application based on a security enforcement for the application in accordance with the initial reputation of the new application and behavior of the new application subsequent to installation;

determine, at the backend system, whether to change the initial reputation of the new application based on the monitored system behavior;

distribute the changed reputation to the plurality of clients;

receive further monitored system behavior based on the changed reputation from the one of the plurality of clients; and determine an action to be performed based on the monitored system behavior from the one of the plurality of clients, wherein the action to be performed comprises changing a reputation of a second application different from the first application and the new application.

* * * * *